Figure 1:
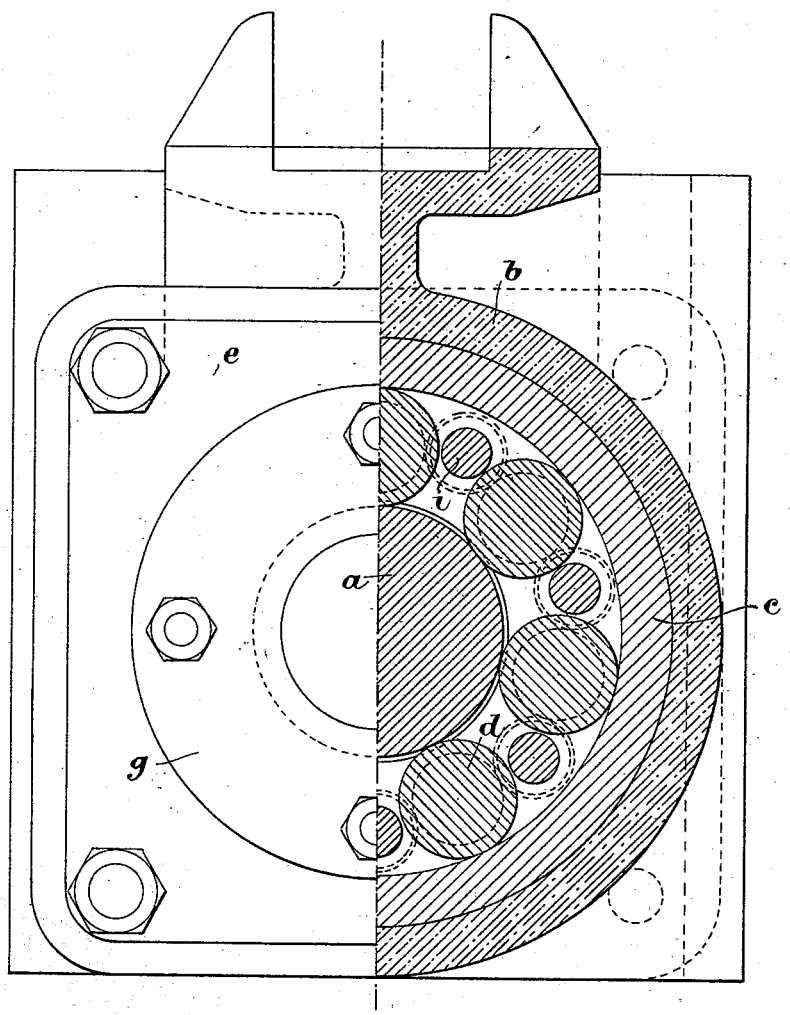

(No Model.) 2 Sheets—Sheet 1.
F. PURDON, H. E. WALTERS & W. H. WOODCOCK.
ROLLER BEARING.

No. 524,397. Patented Aug. 14, 1894.

Witnesses:—
Arthur Woodman
William Bland

Inventors
Fred Purdon
Harry E. Walters
W. Hugh Woodcock
per
John P. O'Donnell
Attorney.

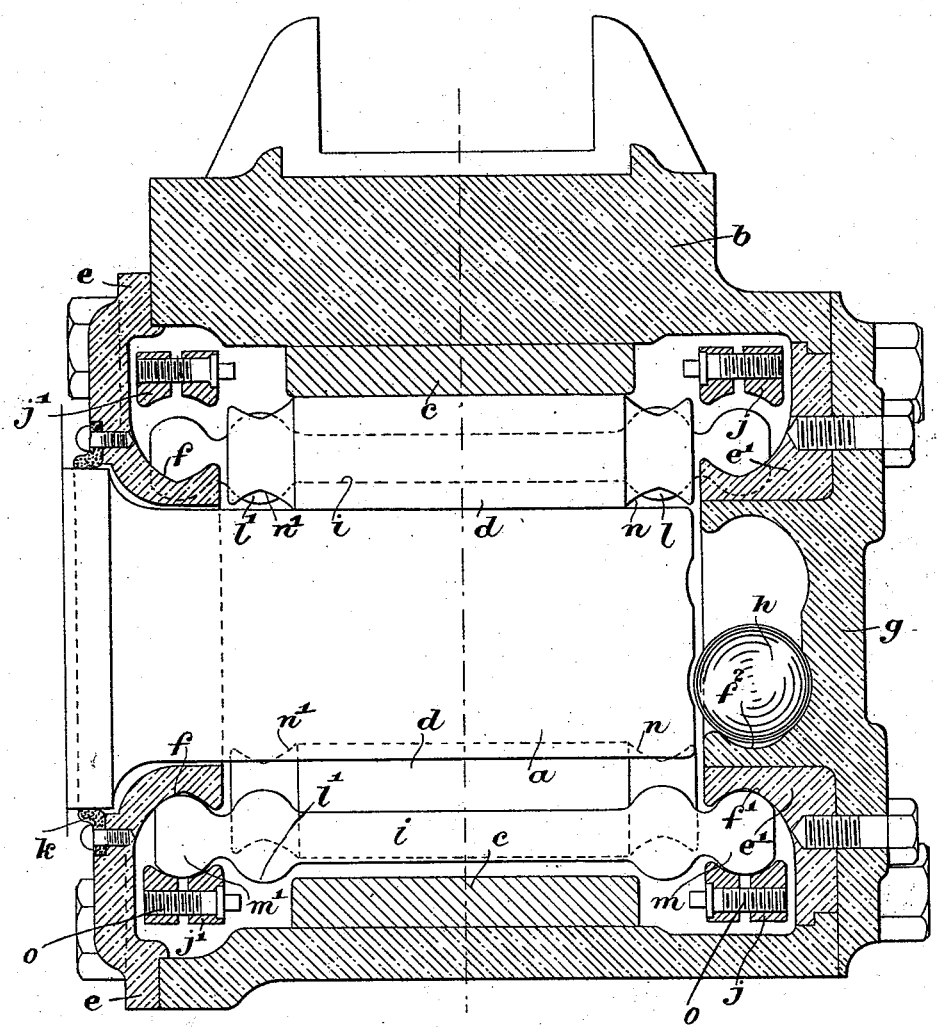

United States Patent Office.

FREDERICK PURDON, HARRY ERNEST WALTERS, AND WILLIAM HUGH WOODCOCK, OF LONDON, ENGLAND, ASSIGNORS TO THE ANTIFRICTION ROLLER BEARING SYNDICATE, LIMITED, OF SAME PLACE.

ROLLER-BEARING.

SPECIFICATION forming part of Letters Patent No. 524,397, dated August 14, 1894.

Application filed January 2, 1894. Serial No. 495,427. (No model.) Patented in England September 30, 1893, No. 18,368.

*To all whom it may concern:*

Be it known that we, FREDERICK PURDON and HARRY ERNEST WALTERS, residing at No. 2 Great George Street, Westminster, London, in the county of Middlesex, and WILLIAM HUGH WOODCOCK, residing at No. 25 Auckland Hill, West Norwood, London, in the county of Surrey, England, subjects of the Queen of Great Britain and Ireland, have invented new and useful Improvements in Roller-Bearings, (for which we have obtained a patent in Great Britain, No. 18,368, bearing date of September 30, 1893,) of which the following is a specification.

Our invention has reference to improvements in roller bearings and has for its object to diminish friction between journals and their bearings.

In the drawings, Figure 1 is an end view of a railway axle box, the left half of the axle box being in section. Fig. 2 is a longitudinal section through the axle box.

$a$ is the journal at the end of the axle of a railway vehicle.

$b$ is the axle box usually made of cast iron.

$c$ is a liner of steel, wrought iron case hardened, chilled cast iron, or other suitable material. Between the liner $c$ and the journal $a$ are arranged a set of rollers $d$ of hardened steel, or other suitable material. The inner diameter of the liner $c$ is equal to the external diameter of the journal $a$ plus twice the diameter of one of the rollers $d$.

The metal cover $e$ is bolted or otherwise fixed to the inner side of the axle box $b$ and has upon it a special circular path $f$: an internal piece $e'$ is fitted into the outer cover $g$ of the axle box and is provided with a special path $f'$, this path being similar to that at $f$. This cap or cover $g$ is bolted or otherwise attached to the axle box, outside, and has a circular path $f^2$ cut upon it, inside. A single ball $h$ is placed inside the cover $g$ and serves to take the end thrust of the journal $a$. Between every two rollers $d$ is placed a dumb-bell roller $i$, and adjustable rings $j$ and $j'$ are placed, one at each end of the box. Dust is excluded by means of the leather ring $k$, and it is claimed that with this design of axle box absolutely no lubrication is needed. The forms of the knobs $l$, $l'$ are so designed as to bear upon the grooved ends $n$, $n'$, respectively, of the rollers $d$, and the forms of the knobs $m$, $m'$ are so designed as to bear upon the paths $f$, $f'$ and are kept in position by the live rings $j$, $j'$.

One most important feature of our invention is that the forms of the knobs $l$, $l'$, $m$, $m'$ on the dumb-bell rollers $i$ and of the grooved paths $n$, $n'$ of the rollers $d$ and of the stationary paths $f$, $f'$ fixed to the axle box, and of the live rings $j$, $j'$ are so designed that each knob bears only upon two circles equidistant from a plane containing the largest cross section of the knob at right angles to its axis of rotation. The relative diameters of rollers, dumb-bell rollers and fixed paths are so chosen that there is no sliding friction but only rolling friction between moving surfaces which touch each other. The dumb-bell rollers $i$ are prevented from escaping in a radial direction by means of the live rings $j$ and $j'$. Each of these rings consists of two similar halves held together by screws $o$ and the width of the curved path inside each ring can thus be adjusted. It will be clearly understood that the expression "live ring" describes the fact that the rings rotate round the axis of the journal as a center when the axle is in motion. Lateral movement of the dumb-bell rollers $i$ is limited by the knobs $m$, $m'$ running in the grooves of the paths $f$, $f'$ and similarly lateral movement of the rollers $d$ is limited by the knobs $l$, $l'$ of the dumb-bell rollers $i$, running in the grooved ends $n$, $n'$ of the rollers $d$.

What we claim is—

1. The combination, with a shaft, and a circular bearing concentric therewith; of the series of rollers $d$ interposed between the said shaft and bearing and provided with grooved ends $n$ $n'$; a series of rollers $i$ interposed between the rollers $d$ and provided with knobs $l$ $m$ and $l'$ $m'$ at their ends, the said knobs $l$ $l'$ running in the grooved ends $n$ $n'$; the stationary end pieces provided with the paths $f$ and $f'$ for the knobs $m'$ and $m$ to run in; and the grooved rings $j$ $j'$ encircling all the knobs $m$ and $m'$, substantially as set forth.

2. The combination, with a shaft, and a circular bearing concentric therewith; of the series of rollers $d$ interposed between the said shaft and bearing and provided with grooved ends $n\ n'$; a series of rollers $i$ interposed between the rollers $d$ and provided with knobs $l\ m$ and $l'\ m'$ at their ends, the said knobs $l\ l'$ running in the grooved ends $n\ n'$; the stationary end pieces provided with the paths $f$ and $f'$ for the knobs $m'$ and $m$ to run in; and the grooved rings $j\ j'$ encircling all the knobs $m$ and $m'$, each said ring being formed in halves and provided with adjusting screws $o$ for drawing the half rings together, substantially as set forth.

FREDERICK PURDON.
HARRY ERNEST WALTERS.
WILLIAM HUGH WOODCOCK.

Witnesses:
JOHN P. O'DONNELL,
WILLIAM A. HANDY.